R. ROGERS.
STOCK CHUTES FOR RAILROAD CARS.
No. 177,009. Patented May 2, 1876.
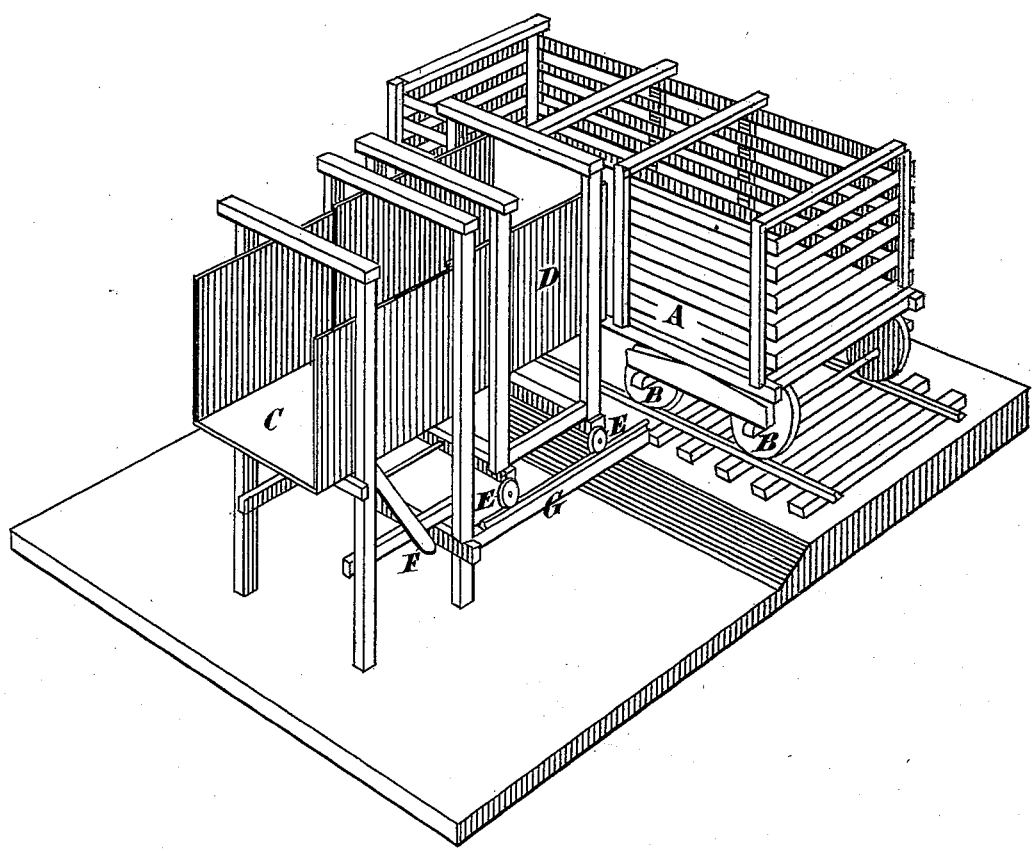
WITNESSES.
Frank Pardon.
C. Hewitt
INVENTOR.
Rofascon Rogers
by J. G. Hewitt
Attorney.

UNITED STATES PATENT OFFICE.

ROFAXON ROGERS, OF LA GRANGE, KENTUCKY.

IMPROVEMENT IN STOCK-CHUTES FOR RAILROAD-CARS.

Specification forming part of Letters Patent No. 177,009, dated May 2, 1876; application filed December 31, 1875.

*To all whom it may concern:*

Be it known that I, ROFAXON ROGERS, of La Grange, in the county of Oldham and State of Kentucky, have invented a certain new and useful Improvement in Stock-Chutes for Railroad-Cars; and I do hereby declare that the following is a full, clear, and exact description thereof, which will enable others skilled in the art to make and use the same, reference being had to the accompanying drawings, forming part of this specification.

The drawing is a perspective view of the device, showing a car on the side track, with the chute arranged at its side.

This my invention relates to a new and useful improvement in chutes for loading stock on railroad-cars, consisting in a small stationary chute or platform, made of the required size, inclosed at the sides by means of slats, or otherwise, and placed at right angles with and nearly on a level with the floor of the car, leaving only a small space of about two or more feet between it and the main car, which space is filled up and connection made with the car by means of another section of the chute, which is placed upon wheels, with one end of the box so arranged as to slide within the stationary chute-box, while the other is made to enter the door of the car, the size of the chute, at all times, being made to correspond with the size of the door of the cars on which it is used. The object in placing one section of the chute on wheels or trucks is to make it movable, so as to be easily drawn back and forth, to clear the car in making the necessary changes from one to another, and at the same time provide a firm closely-fitting platform, over which stock will not refuse to pass, and one that can be easily and readily operated.

In the before-described drawings, in which A is the railroad-car, all of which is made in any of the known forms, B B are the wheels or truck on which it rests. C is the stationary chute or platform, with inclosed sides, all of which is made of wood, and in size to correspond with the door of the car. This stationary chute is placed at right angles with and nearly on a level with the cars, leaving only a space of about two or more feet between them. D is the movable section of the chute, which connects the stationary part with the car, all of which is made of wood, and in form as shown in the drawing, with one end so made as to slide within the stationary chute, while the other enters the door of the car, the whole being made to rest on wheels or trucks, in order to be easily moved in changing cars. E E are the wheels of the truck, which may be made of any suitable size, with axles extending across the chute, working in bearings on the under side of the frame. F is the lever, by which the movable section is operated, which only requires it to be drawn back sufficient to clear the car in changing. G is the track on which it rests.

In cattle-chutes, as heretofore constructed, where the movable chute is made to slide on guide-rails, it has been found that such chutes soon become inoperative or defectively operative by reason of the sticking of such rails, and their wear and liability to easy fracture, and, owing to the necessarily heavy material from which they must be built, their weight is so great as to make it extremely laborious to move them. These difficulties and evils I have overcome by placing my chute on a wheel-truck, which rides on suitable rails, as before set forth.

Having thus fully described the nature and object of this my invention, therefore what I claim as new, and desire to secure by Letters Patent, is—

The moving chute D, combined with a wheel truck or frame riding on rails, and with a stationary chute or platform and operating device, constructed and arranged substantially as described.

ROFAXON ROGERS.

Witnesses:
 FRANK PARDON,
 C. HEWITT.